United States Patent [19]

Klimas

[11] 4,011,997

[45] Mar. 15, 1977

[54] SPRAY-TUBE COUPLING FOR WASHING MACHINES

[75] Inventor: Joachim Klimas, Waldkraiburg, Germany

[73] Assignee: Netzsch-Mohnopumpen-GmbH, Self-Bayern, Germany

[22] Filed: Aug. 1, 1975

[21] Appl. No.: 601,162

[30] Foreign Application Priority Data

Aug. 19, 1974 Germany ........................... 2439638

[52] U.S. Cl. ............................. 239/556; 239/600; 277/188 R
[51] Int. Cl.² ......................................... F16J 15/06
[58] Field of Search .......... 239/556, 566, 567, 600; 277/187, 188; 285/137 R; 134/172, 199, 201

[56] References Cited

UNITED STATES PATENTS

| 2,914,255 | 11/1959 | Jepson | 239/566 X |
|---|---|---|---|
| 2,992,779 | 7/1961 | James et al. | 239/226 |
| 3,218,087 | 11/1965 | Hallesy | 277/188 R X |
| 3,257,118 | 6/1966 | Broadhead et al. | 277/188 R X |
| 3,300,225 | 1/1967 | Shepler | 277/187 X |
| 3,323,806 | 6/1967 | Smith et al. | 277/188 R X |
| 3,531,168 | 9/1970 | Bainard | 277/187 X |
| 3,685,838 | 8/1972 | Malmstrom | 308/187.1 X |

Primary Examiner—Evon C. Blunk
Assistant Examiner—Michael Mar
Attorney, Agent, or Firm—Karl W. Flocks

[57] ABSTRACT

A coupling arrangement for tubes, pipes or like members in a washing machine comprises one or more tubes provided with a ring packing on one end thereof, a coupling member on the machine, and a clamping device for engaging the tube. The ring packing is formed in three integral portions including a slide ring portion for guided axial displacement, an elastically axially compressible central part and an axially fixed supporting ring. The coupling arrangement is assembled by an insertion of the slide ring portion into an opening in the coupling member and pressed therein by the clamping device which first stresses the central part and urges it toward the coupling member and thereafter allows a slight backing away of the central part away from the coupling member. The slide ring portion is formed with a conical end surface for reception in and cooperation with the coupling member of which the opening is formed with a corresponding or mating surface to maintain a light seal.

6 Claims, 5 Drawing Figures

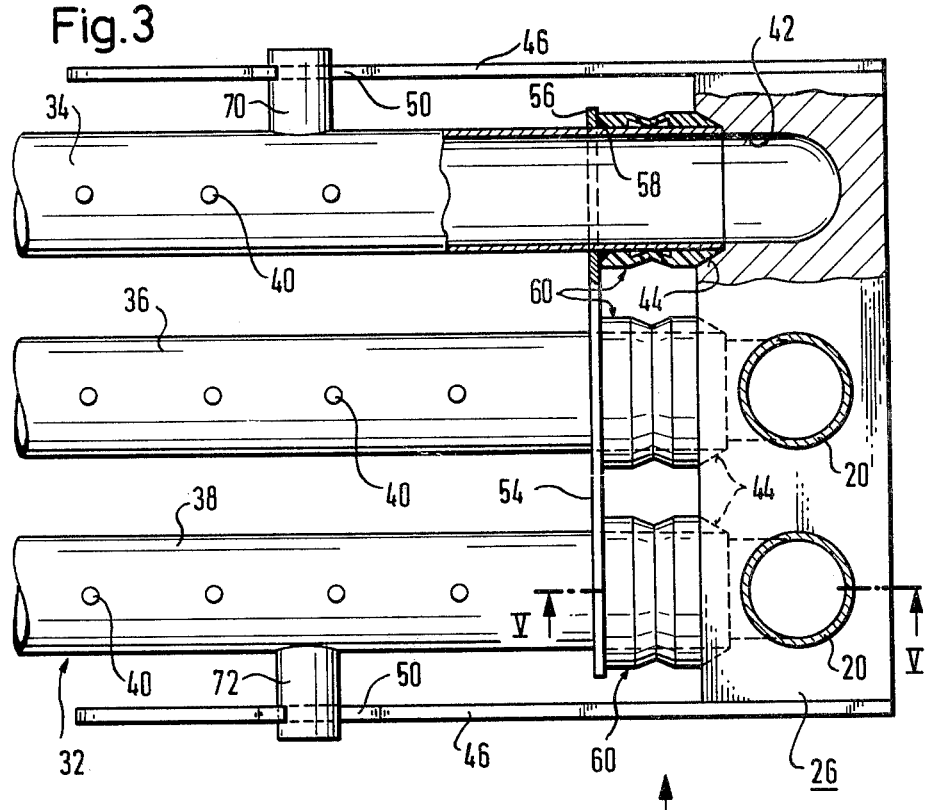
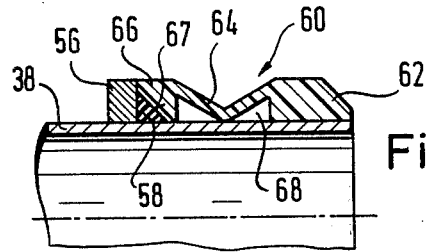
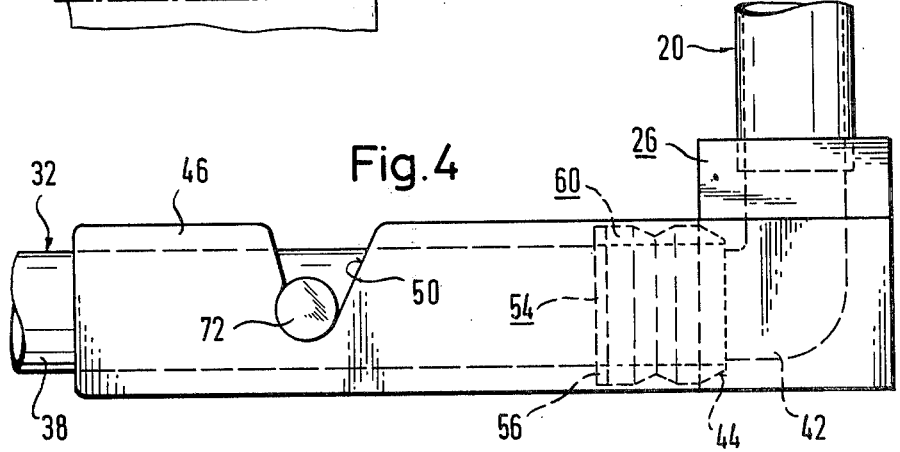

SPRAY-TUBE COUPLING FOR WASHING MACHINES

BACKGROUND OF THE INVENTION

1. Field of the Invention

The invention relates to a coupling arrangement for spray-tube in washing machines or the like in which a ring packing on the end of a spray-tube is pressed into a coupling opening of the machine by a clamping device engaging the spray-tube.

2. Description of the Prior Art

In the case of machines for washing dishes, glass vessels, laboratory devices, etc., it is known to be of advantage if at least the spray tubes that are supplied with undistilled water can be removed for the purpose of cleaning them and they are thus known to be provided for such a purpose with rapidly detachable spray-tube couplings. In the case of a known spray-tube coupling of the type described (German Utility Model 6,941,340), the spray tubes are inserted into coupling openings formed laterally on a coupling block. Each spray tube is provided with a ring packing on an end to be coupled. During the insertion of the spray tube into the coupling opening the packing contacts the preferably conically formed boundary of the coupling opening and is stressed. Horizontal side bars extend from the coupling block and are provided with recesses that are engaged by pins attached to the corresponding spray tube. The recesses are shaped in such a manner that during the insertion of the pins, the spray tube is initially pushed to an increasing extent into the coupling opening with th ring packing being subjected to a strong stress. Subsequently as the pins are inserted further into the recesses, the spray tube is backed away somewhat from the coupling opening, with the pins locking into the recesses as a result of the pressure of the ring packing, so that finally the spray tube is held firmly in the coupling opening due to the pressure or stress on the ring packing. Side bar elements are additonally provided with safety stirrups with which the pins can be locked in the recesses.

After a certain period of operation, sealing problems may result in connection with such known spray-tube couplings. In particular, it is known that after a removal of the spray tubes, e.g., for the purpose of cleaning them, the ring packings must be replaced, since they lose their elasticity and cannot be used again due to the high stressing through the washing liquids and the high temperatures.

SUMMARY OF THE INVENTION

The present invention provides a new and improved spray-tube coupling arrangement of the type described at the outset, which arrangement ensures a tight seat of the spray tube in the coupling opening after long periods of operation even under difficult operational conditions.

The invention solves the problem in such a manner that the ring packing comprises a slide ring portion guided on the end of the spray tube having the capability of axial displacement, a central part which can be elastically compressed in an axial direction and a supporting ring portion held in a fixed axial position on the nozzle tube. With this arrangement, the slide ring portion which engages the coupling opening can be displaced a relatively large distance in relation to the supporting ring portion fixed on the spray tube, while the ring packing is reliably unstressed beyond its elastic range during the insertion or assembly of the spray tube. The elastically compressible central part provided in accordance with the invention thus provides a counter force, caused by the axial shifting of the packing during the insertion of the spray tube into the coupling opening, and effects a reliable sealing of the spray tube in relation to the coupling opening even after long periods of operation and after repeated disassembly and assembly of the spray tube.

The supporting ring portion is advantageously supported on a flange of the spray tube. This type of ring-packing attachment provides very good reliability in displacing the slide ring portion which can be displaced with respect to the spray tube. Moreover, if the ring packing is damaged, it can be then replaced in a simple manner, since it need only be pulled from the spray tube.

In a preferred embodiment of the spray-tube coupling according to this invention, an additional sealing ring is inserted between an inner conical surface of the supporting ring portion and the flange. While the slide ring portion through its firm contact with the boundary of the coupling opening effects a reliable seal only between the boundary of the coupling opening and the ring packing, the additional sealing ring provides the seal between the ring packing and the spray tube.

If the spray-tube coupling is used for coupling to a coupling block in which a plurality of mutually-parallel spray tubes are joined into a spray-tube group, it is of advantage to have the flanges of the spray tubes form a plate with which the spray tubes are combined into the spray-tube group. The spray tubes thus combined into a spray-tube group can be jointly inserted each into a coupling opening formed on the coupling block.

Ring packings of polyfluoroethylene have been used in practical applications with satisfaction.

The central part of the ring packing used in the present invention is advantageously formed with a V-shaped axial section comprising radially-inward oriented tip or vertex. The arms of the V-shaped central part connect the supporting ring portion and the slide ring portion in the manner of an elastically yielding knee-joint during conjoint shifting of the central part, both the arms and also the angle between the arms and the angles with which the arms are coupled respectively to the slide and the supporting ring portions are deformed or changed. The central part can thus be highly compressed axially without permanent deformation. With the slide ring portion in sealing relation to the spray tube, the air enclosed around the spray tube in an annular chamber defined by the central part forms an elastic pressure cushion. During compression of the central part the cushion intensifies the counterforce produced by the central part due to a displacement of the slide ring portion.

It is advantageous to provide an embodiment of the ring packing with an annular chamber defined by the central part around the spray tube communicating with the coupling opening. In such an arrangement, the interior of the annular chamber is subjected to the action of the pressure of the liquid, which pressure tends toward stretching the knee-joint formed by the arms of the V-shaped central part, so that the force produced during a shifting of the slide ring portion during the insertion of the spray tube into the coupling opening and with which the slide ring rests against the edge of the coupling opening is increased.

The ring packing of the present invention can not only be used on spray tube couplings in washing machines but also with advantage in many types of tube connections, especially plug connections and rapid couplings comprising sleeve nuts and screw-collar rings.

BRIEF DESCRIPTION OF THE DRAWINGS

By reference to the accompanying drawings, it will be seen that various features of the present invention are illustrated in:

FIG. 3 which shows a view of a coupling assembly, on an enlarged scale, as seen partly in section in the plane along the line III—III of FIG. 1;

FIG. 4 which shows a side elevation of the nozzle-tube coupling in the direction of the arrow IV of FIG. 3; and FIG. 5 which shows an enlarged section along the line V—V of FIG. 3.

DESCRIPTION OF A PREFERRED EMBODIMENT

Figure 1:
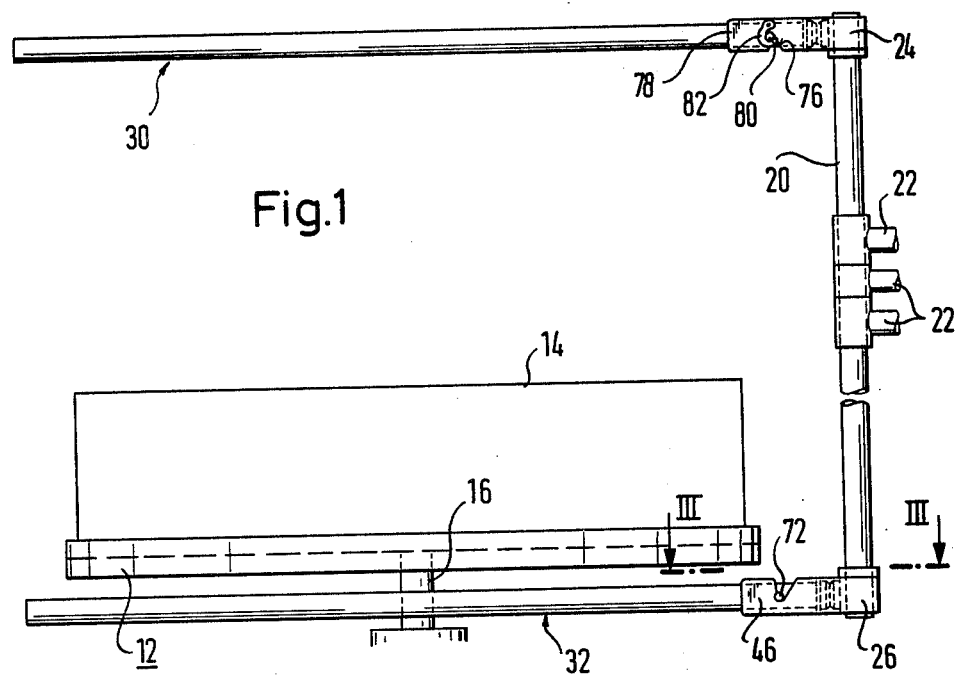
FIG. 1 which shows a side elevation of parts of a washing machine.
Figure 2:
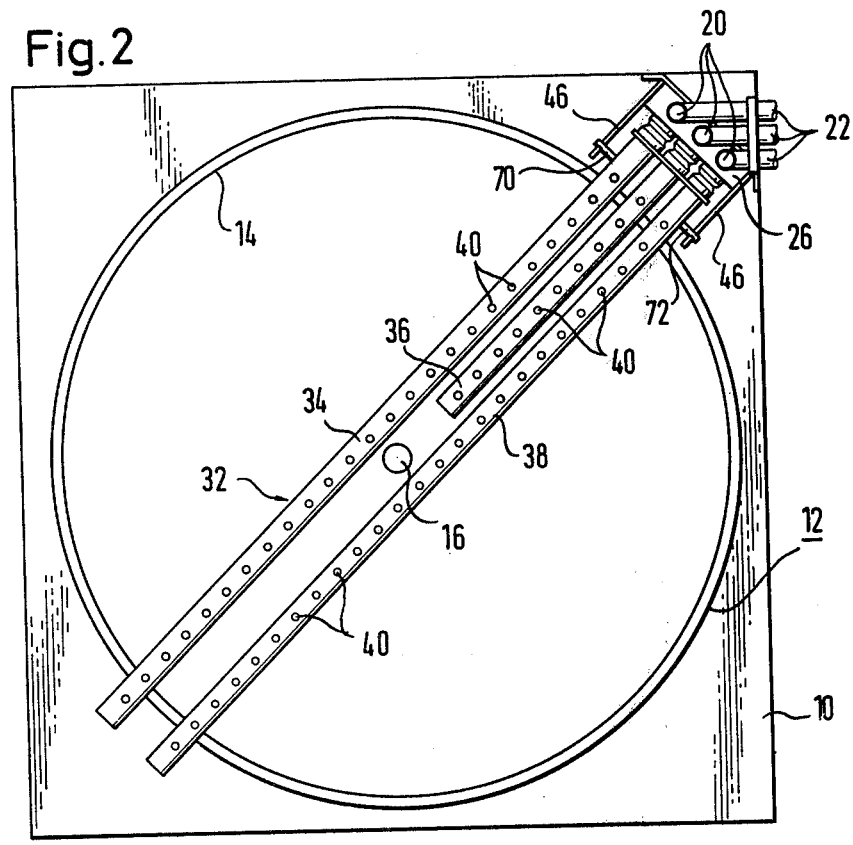
FIG. 2 which shows a plan view of the machine of FIG. 1.

As may be seen in FIGS. 1 and 2, a washing machine is provided with a housing 10, which is generally rectangular as a whole and indicated only in FIG. 2, and a rotary platform 12, comprising a basket 14 for the articles or material to be washed, mounted in the housing to be rotatably driven about a vertical shaft 16.

Three vertically arranged risers 20 are provided in a corner of housing 10. Washing liquid, distilled water and rinsing liquid are supplied respectively to the risers 20 in each case through a feed pipe 22. Risers 20 are secured in housing 10 in an upper coupling block 24 and in a lower coupling block 26. An upper spray-tube group 30 and a lower spray-tube group 32 extend diagonally to housing 10 with wash basket 14 disposed therebetween. Each of the tube groups 30 and 32 contain three spray tubes.

In FIG. 2 lower spray-tube group 32 can be seen to include three spray tubes 34, 36 and 38. Each spray tube of each spray-tube group is coupled in one of coupling blocks 24, 26 to one of risers 20 in each case. Spray tubes 34, 36 and 38 of lower spray-tube group 32 are provided with upward-directed spray apertures or orifices 40, while the spray tubes of upper spray-tube group 30 that are not shown separately are provided with downwardly directed spray apertures or orifices.

The manner in which each spray tube is attached to the corresponding coupling block may be seen in FIGS. 3 and 4 as represented by the way in which spray tubes 34, 36 and 38 and lower coupling block 26 are arranged. The lower coupling block 26 is provided with passages 42 which include right angle portions and receive risers 20. Each passage 42 ends in a coupling opening 44 directed laterally on coupling block 26. Coupling openings 44 are conical and diverge in an outward direction. A rigid side bar 46, extending on each side of coupling block 26 is formed with a recess 50 spaced away from coupling block 26. Spray tubes 34, 36, 38 are joined into spray-tube group 32 by means of a plate 54, through which such tubes extend. Plate 54 forms a flange 56 on each spray tube 34, 36, 38 at a distance from its end. A sealing ring 58 and a packing ring 60 are slid on the end of each spray tube 34, 36, 38, which is shown in further detail in FIG. 5.

Ring packing 60 in three portions includes a frontal slide ring 62 that can be axially displaced with respect to spray tube 38 and is joined with a supporting ring 66 by a central part 64 that can be elastically conjointly shifted. Supporting ring 66 as assembled is in contact with flange 56. Toward flange 56 and spray tube 38, supporting ring 66 is provided with an inner conical surface 67, in which sealing ring 58 is disposed. Central part 64 is V-shaped in axial section, the vertex or tip of the V pointing toward spray tube 38. An annular chamber 68 is formed between V-shaped central part 64 and spray tube 38. Slide ring 62 is sloped in front in a manner to provide correspondence with conical coupling opening 44.

A pin 70 extends laterally from spray tube 34 at a distance from flange 56 and a corresponding pin 72 extends from spray tube 38 to the opposite side. The distances between pins 70, 72 and the respective ends of corresponding spray tubes 34, 38 is equal to the distances between recesses 50 and the coupling block 26.

Spray-tube group 32 is assembled with coupling block 26 by inserting spray tubes 34, 36, 38 with their ends, provided in each case with a sealing ring 58 and a ring packing 60 thereon, obliquely from above into coupling openings 44. Spray tubes 34, 36, 38 extend readily in this manner into coupling openings 44 and the sloped ends of slide rings 62 of ring packings 60 rest in and against conical coupling openings 44. Entire spray-tube group 32 is then pivoted downward about coupling openings 44, so that pins 70, 72 engage recesses 50. Recesses 50 have such a shape that, during the pivoting of spray-tube group 32, pins 70, 72 slide into recesses 50 and press spray-tube group 32 into coupling openings 44. Slide ring 62 of each ring packing 60 is shifted in this connection toward flange 56, so that as a result of the elastic compression of central part 64 a force is produced, which force presses spray tubes 34, 46, 38 away from coupling openings 44 and finally allows pins 70, 72 to snap into locking portions of recesses 50 that are somewhat more distant from coupling block 26. On such a locking, ring packings 60 are somewhat relaxed due to the movement of spray-tube group 32 away from coupling openings 44, but yet remain under such stress that pins 70, 72 are reliably locked in recesses 50 and spray-tube group 32 is attached to coupling block 26.

The deformation of ring packing 60 is largely absorbed by its central part 64, wherein the cross-sectional area of ring packing 60 is reduced. A pressure cushion is thus formed in annular chamber 68 of central part 64 which intensifies the force produced by such an elastic deformation, the force effecting sealing contact between slide part 62 and the boundary of coupling opening 44, on the one hand, and of a locking engagement between pins 70, 72 and recesses 50, on the other hand. When slide ring 62 is in tight contact with spray tube 38, the pressure cushion is produced by the air enclosed in annular chamber 68. If slide ring 62 is guided in a loose manner on nozzle tube 38, the cushion is produced additionally by the liquid entering ring chamber 68. The pressure cushion exhibits the tendency of increasing the angle between the arms of V-shaped central part 64, so as to produce a force which tends to remove slide ring 62 from supporting ring 66.

The tightness of ring packing 60 is produced on the one hand, through the contact of the forward-sloped slide ring 62 with correspondingly sloped coupling opening 44 and, on the other hand, through the contact of slide ring 62 with spray tube 38 as well as the contact of supporting ring 66 with flange 56 and the pressure exerted by supporting ring 66 on sealing ring 58.

Upper spray-tube group 30 is inserted into upper coupling block 24 in a similar manner. Recesses 76 of side bars 78 associated with this coupling block 24 extend from below into side bars 78, according to FIG. 1. Spray-tube group 30 is tilted in from below in a similar manner in which pins 80 engage recesses 76. Since a considerable downward thrust is exerted by upper assembly 30, due to its weight, and the forces brought about by ring packings 60 and locking pins 80 in recesses 76 are merely limited, it is of advantage to lock pins 80 of upper spray-tube group 30 in recesses 76 through additional safety levers 82.

When a spray-tube group is to be removed, the safety levers are released in a given case; the spray-tube group assembly need then only to be pressed slightly toward the coupling openings, so that the pins are disengaged from the recesses and the spray-tube group can be swung out of the side bars.

Should it be required to replace a sealing ring or a ring packing, the replacement is made possible in a very simple manner when the spray-tube group is removed, since neither ring packing 60 nor sealing ring 58 is rigidly attached to the spray tube; rather, such parts can simply be removed from the spray tube or slid on such a tube.

It will be obvious to those skilled in the art that various changes may be made without departing from the scope of the invention and the invention is not to be considered limited to what is shown in the drawings and described in the specification.

What is claimed is:

1. A quick-release spray tube coupling arrangement for washing machines comprising a sealing ring surrounding one end of a spray tube in sleeve-like manner, said sealing ring having a sealing portion with a tapered end, an elastically axially compressible central part supporting and connecting said tapered end on a supporting ring portion fixed on said spray tube in an axial direction, said spray tube extending into an opening in a coupling member with said tapered end of said sealing ring engaging said opening, a lock mechanism clamping said spray tube and subjecting it to a bias toward the coupling opening and subjecting said sealing ring to axial displacement as a whole on the end portion of the spray tube facing the coupling member without changing the shape of said tapered end sealing portion.

2. The spray tube coupling arrangement as defined in claim 1, wherein said sealing portion, said central part, and said supporting ring portion comprise one integral member and the central part is V-shaped in axial section with radially inwardly directed tip, and in which said central part defines an annular chamber around the spray tube in communication with an opening of said coupling member.

3. The spray tube coupling arrangement as defined in claim 2, in which said sealing ring including said sealing portion, said central part and said supporting ring is made of polyfluoroethylene.

4. The spray tube coupling arrangement as defined in claim 2, in which said supporting ring bears against a flange on said spray tube and may be drawn off the spray tube together with said sealing portion and the central part.

5. The spray tube coupling arrangement as defined in claim 2, in which said supporting ring is formed with an inner conical surface and an additional sealing ring is disposed between the inner conical surface and a flange on said spray tube.

6. The spray tube coupling arrangement as defined in claim 4, in which a plurality of mutually parallel spray tubes combined and assembled into a spray tube group each time are inserted jointly in each case into a coupling opening provided on a coupling block and with flanges on the spray tubes forming a plate with which the spray tubes are joined into the said spray tube group.

* * * * *